United States Patent
Wang et al.

(10) Patent No.: US 12,432,268 B2
(45) Date of Patent: Sep. 30, 2025

(54) IMPROVING EFFICIENCY OF FILE DISTRIBUTION

(71) Applicant: RAKUTEN MOBILE, INC., Tokyo (JP)

(72) Inventors: Yidao Wang, Tokyo (JP); Makoto Ono, Tokyo (JP); Takatsugu Ishikawa, Tokyo (JP); Yoshihiro Tanaka, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/038,493

(22) PCT Filed: Jan. 26, 2023

(86) PCT No.: PCT/JP2023/002512
§ 371 (c)(1),
(2) Date: May 24, 2023

(87) PCT Pub. No.: WO2024/157427
PCT Pub. Date: Aug. 2, 2024

(65) Prior Publication Data
US 2025/0080604 A1    Mar. 6, 2025

(51) Int. Cl.
*H04L 67/06*    (2022.01)
*H04L 67/1074*    (2022.01)
*H04L 67/1097*    (2022.01)

(52) U.S. Cl.
CPC .......... *H04L 67/06* (2013.01); *H04L 67/1076* (2013.01); *H04L 67/1097* (2013.01)

(58) Field of Classification Search
CPC ....... G06F 16/16; G06F 16/182; G06F 16/176
See application file for complete search history.

(56) References Cited

U.S. PATENT DOCUMENTS

| | | | |
|---|---|---|---|
| 8,682,862 B2 * | 3/2014 | Rosikiewicz | G06F 11/1469 707/679 |
| 8,874,531 B2 * | 10/2014 | Sulieman | G06F 16/183 707/693 |
| 2014/0297735 A1 | 10/2014 | Aoyagi et al. | |

(Continued)

FOREIGN PATENT DOCUMENTS

| | | |
|---|---|---|
| EP | 2 735 972 A1 | 5/2014 |
| JP | 2019-519180 A | 7/2019 |

(Continued)

OTHER PUBLICATIONS

International Search Report for PCT/JP2023/002512 dated Apr. 11, 2023 (PCT/ISA/210).

*Primary Examiner* — Chirag R Patel
(74) *Attorney, Agent, or Firm* — Sughrue Mion, PLLC

(57) ABSTRACT

A file distribution system provided with a file distribution apparatus and a file reception apparatus, wherein: the file distribution apparatus has one or more first processors; and the one or more first processors execute a process including transmitting, to the file reception apparatus, multiple layers included in a first file to be distributed to the file reception apparatus, and among multiple layers included in a second file to be distributed to the file reception apparatus, a layer other than a common layer that is included in common in the first file and the second file.

5 Claims, 12 Drawing Sheets

(56) References Cited

U.S. PATENT DOCUMENTS

2019/0129745 A1   5/2019 Wang
2021/0144517 A1   5/2021 Guim Bernat et al.

FOREIGN PATENT DOCUMENTS

| JP | 2022-530580 A | 6/2022 |
| WO | 2013/069329 A1 | 5/2013 |
| WO | 2015/011840 A1 | 1/2015 |

* cited by examiner

IMPROVING EFFICIENCY OF FILE DISTRIBUTION

TECHNICAL FIELD

The present disclosure relates to improvement of the efficiency of file distribution.

In recent years, in wireless communication systems such as, for example, 5G systems, network functions are sometimes virtualized, and network functions that have been virtualized are also referred to as virtual network functions (VNFs). VNFs can be deployed at various locations in a network, and enable flexible network configurations. For example, when wishing to reduce delays in network services, the VNFs providing services to end users are deployed not in large-scale facilities, such as central data centers (CDCs), that are constructed at the centers of networks, but rather in mid-scale or small-scale facilities, such as regional data centers (RDCs) or group centers (GCs), located nearer to the end users.

CITATION LIST

Patent Literature

Patent Document 1: JP 2022-530580 A
Patent Document 2: JP 2019-519180 A

SUMMARY OF INVENTION

Technical Problem

Since large-scale storage capable of storing large volumes of data often cannot be installed in mid-scale or small-scale facilities, particularly in GCs, when a VNF is deployed in a mid-scale or small-scale facility such as an RDC or a GC, the files necessary for deployment are transmitted from a large-scale facility such as a CDC to the mid-scale or small-scale facility. However, in the case in which the files for deploying a VNF are transmitted from a large-scale facility to a mid-scale or small-scale facility, there is a problem in that the load on the network increases. When the load on a network increases, users utilizing communication services will be affected, such as by the communication speed becoming lower, and reductions in the communication traffic between facilities are sought.

The present disclosure was made in consideration of the above, and has, as an objective thereof, to provide improved efficiency of file distribution, which can suppress the load on a network by reducing the communication traffic between facilities.

Solution to Problem

According to one embodiment disclosed herein, a file distribution system is provided with a file distribution apparatus and a file reception apparatus. The file distribution apparatus has one or more first processors, and the one or more first processors execute a process including transmitting, to the file reception apparatus, multiple layers included in a first file to be distributed to the file reception apparatus, and among multiple layers included in a second file to be distributed to the file reception apparatus, a layer other than a common layer that is included in common in the first file and the second file.

Additionally, according to one embodiment disclosed herein, a file distribution method includes transmitting, to a file reception apparatus, multiple layers included in a first file to be distributed to the file reception apparatus, and among multiple layers included in a second file to be distributed to the file reception apparatus, a layer other than a common layer that is included in common in the first file and the second file.

DESCRIPTION OF EMBODIMENTS

Hereinafter, embodiments according to the present disclosure will be explained with reference to the attached drawings. The embodiments explained below are merely exemplary, and this description should not be construed in a limiting manner.

Embodiment 1

Figure 1:
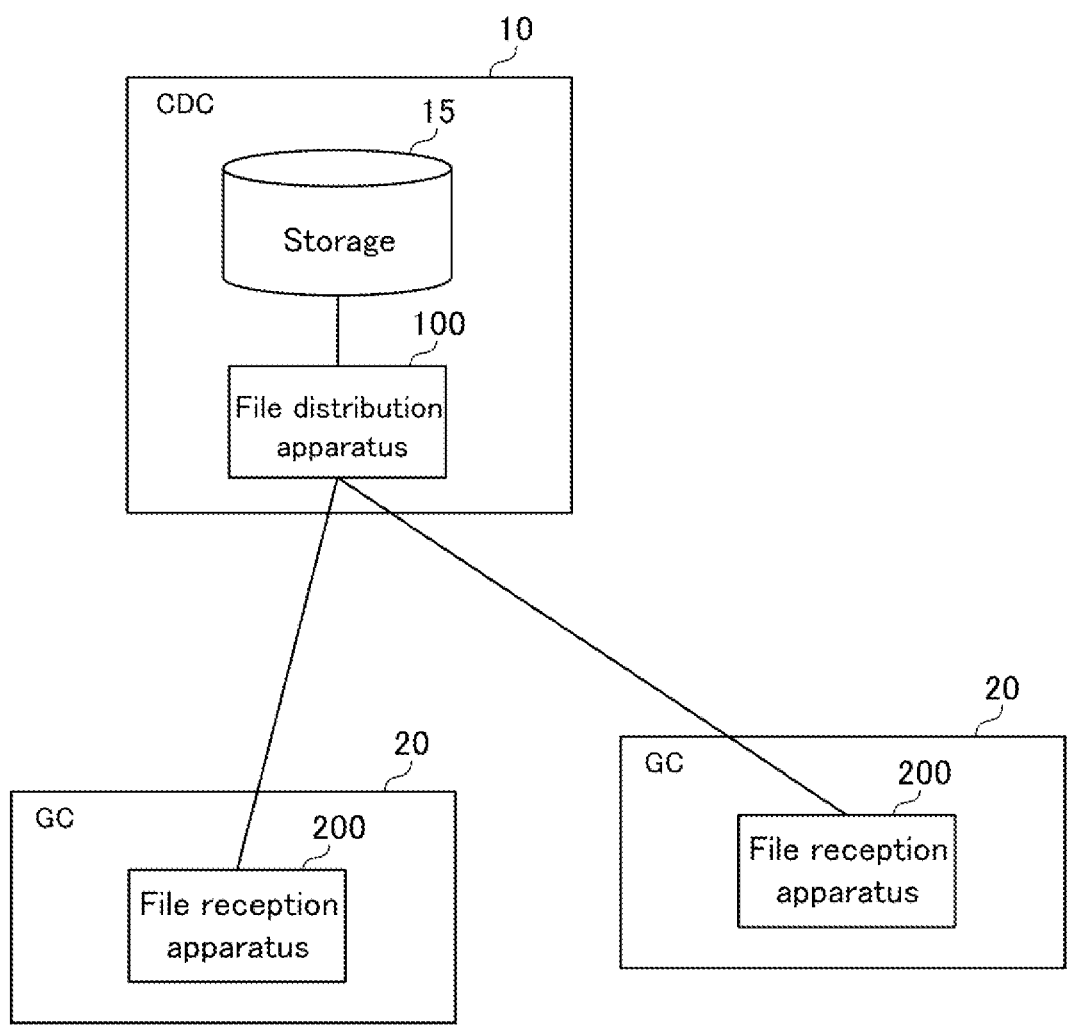
FIG. 1 is a diagram depicting an example of a file distribution system according to Embodiment 1.

FIG. 1 is a diagram depicting an example of a file distribution system according to Embodiment 1. The file distribution system depicted in FIG. 1 is a system for distributing files necessary for deploying a VNF from a CDC 10, which is a large-scale facility, to GCs 20, which are small-scale facilities. Although the file distribution system is depicted as having a single CDC 10 and two GCs 20 in FIG. 1, the numbers of the CDCs 10 and the GCs 20 in the file distribution system are not limited to the above.

Additionally, though omitted from depiction in FIG. 1, the file distribution system may further have an RDC, and files may be distributed from the CDC 10 to the RDC. Although an example of the case in which files are distributed from the CDC 10 to the GCs 20 will be explained below, the technology disclosed herein may also be applied to the case in which the CDC 10 distributes files to an RDC.

The CDC 10 is a data center constructed at the center of a network, and is provided with a storage 15 and a file distribution apparatus 100.

The storage 15 stores files to be distributed to mid-scale or small-scale facilities such as the GCs 20. The files are constituted by being provided with multiple small files known as layers, and the storage 15 stores each of the layers constituting the respective files. Additionally, the storage 15 stores, regarding each of the files, layer information specifying the layers constituting the files.

The file distribution apparatus 100 distributes files to mid-scale or small-scale facilities such as the GCs 20. That is, the file distribution apparatus 100 acquires the layers constituting the files necessary for deploying the VNF in the respective GCs 20 from the storage 15, and transmits the acquired layers to the GCs 20. When distributing multiple files to a single GC 20, the file distribution apparatus 100 does not redundantly transmit layers that are common to these multiple files. In other words, when distributing a second file after having transmitted multiple layers contained in a first file, the file distribution apparatus 100 transmits the layers, among multiple layers contained in the second file, that are not common to the first file. The configuration and operations of the file distribution apparatus 100 will be described in detail below.

The GCs 20 are small-scale facilities located near end users, provided with file reception apparatuses 200.

The file reception apparatuses 200 are communicably connected with the file distribution apparatus 100 and receive files distributed from the file distribution apparatus 100. That is, the file reception apparatuses 200 receive, from the file distribution apparatus 100, layers constituting files necessary for deployment of VNFs in the GCs 20. Then, the file reception apparatuses 200 restore the files from the received layers. At this time, the file reception apparatuses 200 duplicate layers that are common to multiple files, as needed, to restore the respective files. The configurations and operations of the file reception apparatuses 200 will be described in detail below.

Figure 2:
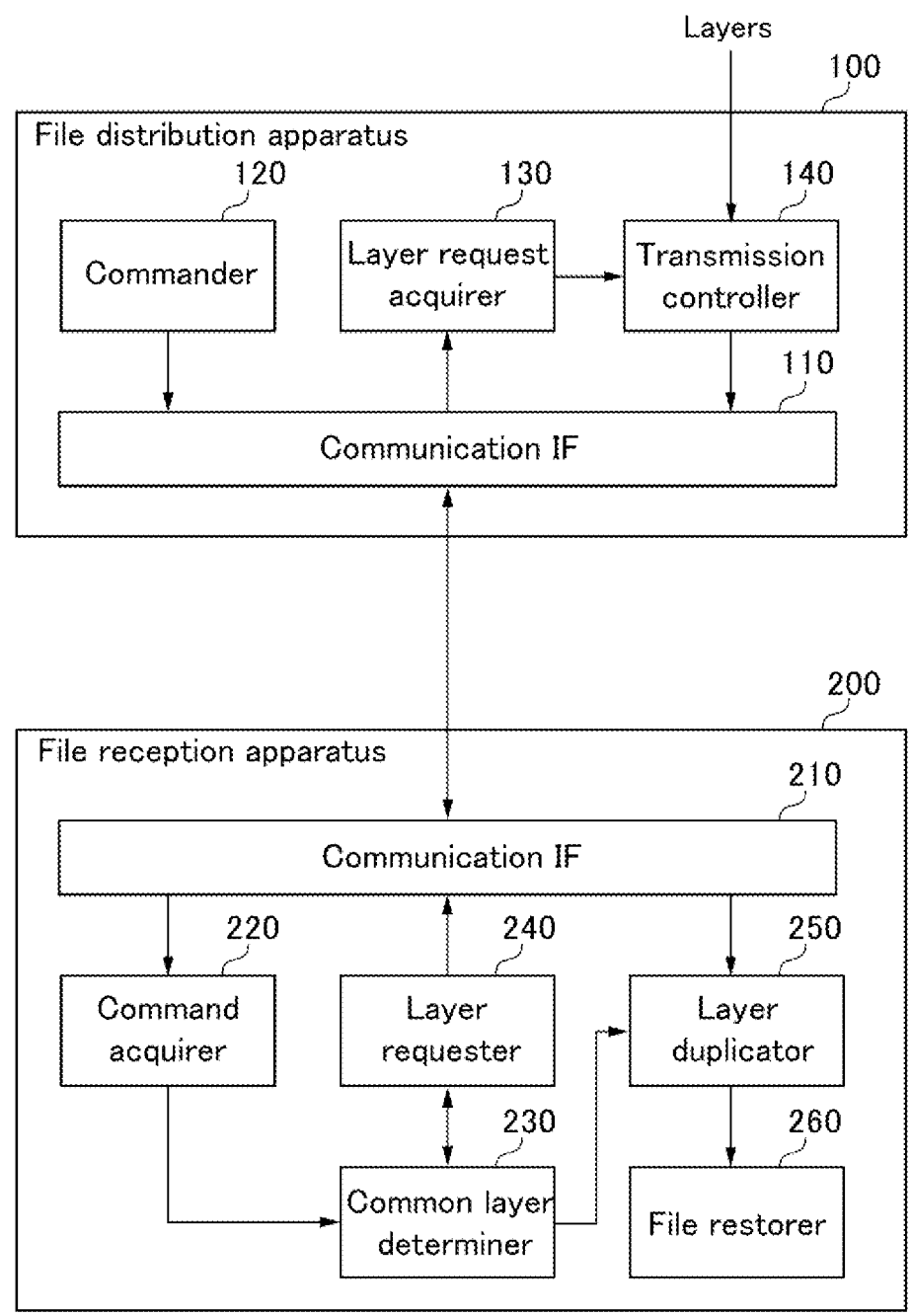
FIG. 2 is a block diagram depicting the configuration of the file distribution system according to Embodiment 1.

FIG. 2 is a block diagram depicting the configuration of the file distribution system according to Embodiment 1. As depicted in FIG. 2, the file distribution system has a file distribution apparatus 100 and a file reception apparatus 200.

The file distribution apparatus 100 has a communication interface (hereinafter abbreviated to as "communication IF") 110, a commander 120, a layer request acquirer 130, and a transmission controller 140.

The communication IF 110 is an interface for communicating with the file reception apparatus 200. The communication IF 110 transmits file download commands and layers constituting files to the file reception apparatus 200, and receives layer requests for requesting the transmission of layers from the file reception apparatus 200.

The commander 120 transmits download commands for providing instructions to download files necessary for deploying VNFs to the file reception apparatus 200 via the communication IF 110. The download commands transmitted by the commander 120 include layer information specifying the layers constituting each of the multiple files to be downloaded.

The layer request acquirer 130 acquires layer requests that have been transmitted from the file reception apparatus 200 and received in the communication IF 110. That is, the layer request acquirer 130 acquires layer requests indicating layers requested by the file reception apparatus 200.

The transmission controller 140 acquires layers requested by the file reception apparatus 200 from the storage 15 in accordance with layer requests acquired by the layer request acquirer 130, and transmits the layers to the file reception apparatus 200 via the communication IF 110. As will be explained below, the layer requests from the file reception apparatus 200 do not redundantly request layers that are common to multiple files to be downloaded. Therefore, the transmission controller 140 does not redundantly transmit layers that are common to multiple files. As a result, the communication traffic between the file distribution apparatus 100 and the file reception apparatus 200 can be reduced and the load on the network can be suppressed.

The file reception apparatus 200 has a communication IF 210, a command acquirer 220, a common layer determiner 230, a layer requester 240, a layer duplicator 250, and a file restorer 260.

The communication IF 210 is an interface for communicating with the file distribution apparatus 100. The communication IF 210 receives file download commands and layers constituting files from the file distribution apparatus 100, and transmits layer requests for requesting the transmission of layers to the file distribution apparatus 100.

The command acquirer 220 acquires download commands transmitted from the file distribution apparatus 100 and received in the communication IF 210. That is, the command acquirer 220 acquires download commands including layer information for multiple files to be downloaded.

The common layer determiner 230 references the layer information included in the download commands and determines whether or not the multiple files to be downloaded include layers in common (hereinafter referred to as "common layers"). Specifically, the common layer determiner 230, for example, compares the layer information of a first file to be downloaded with the layer information of a second file to be downloaded, and determines whether or not the first and second files include common layers.

Then, the common layer determiner 230 determines layers to be requested from the file distribution apparatus 100 so that common layers of multiple files are not redundantly transmitted. That is, the common layer determiner 230 determines, for example, that all of the layers constituting the first file to be downloaded are to be requested, and that among the layers constituting the second file to be downloaded, the layers other than the common layers that are common to the first file are to be requested. The common layer determiner 230 notifies the layer requester 240 of the layers for which transmission is to be requested. Additionally, the common layer determiner 230 transmits the layer information of the multiple files to be downloaded to the layer duplicator 250.

The layer requester 240 generates layer requests requesting the transmission of layers reported by the common layer determiner 230, and transmits the generated layer requests to the file distribution apparatus 100 via the communication IF 210. At this time, the layer requester 240 may transmit a layer request for requesting all of the layers constituting the multiple files to be downloaded together. Additionally, the layer requester 240 may, for example, transmit a layer request for requesting all of the layers constituting the first file to be downloaded, and thereafter, transmit a layer request for requesting the layers, among the layers constituting the second file to be downloaded, other than the common layers that are common to the first file. Essentially, the layer requester 240 transmits layer requests such that common layers that are common to multiple files to be downloaded are not redundantly transmitted.

The layer duplicator 250 acquires layers that are transmitted from the file distribution apparatus 100 in response to layer requests, and that are received by the communication IF 210. Then, the layer duplicator 250 references the layer information of the files to be downloaded and duplicates layers necessary for restoring the files to be downloaded. That is, the layer duplicator 250 duplicates the required number of the common layers that are common to the multiple files to be downloaded for restoring all of the files to be downloaded.

The file restorer 260 uses the layers duplicated by the layer duplicator 250 to restore the files to be downloaded. That is, the file duplicator 260 restores the files from the layers constituting each of the files in accordance with the layer information of the files to be downloaded.

Figure 3:
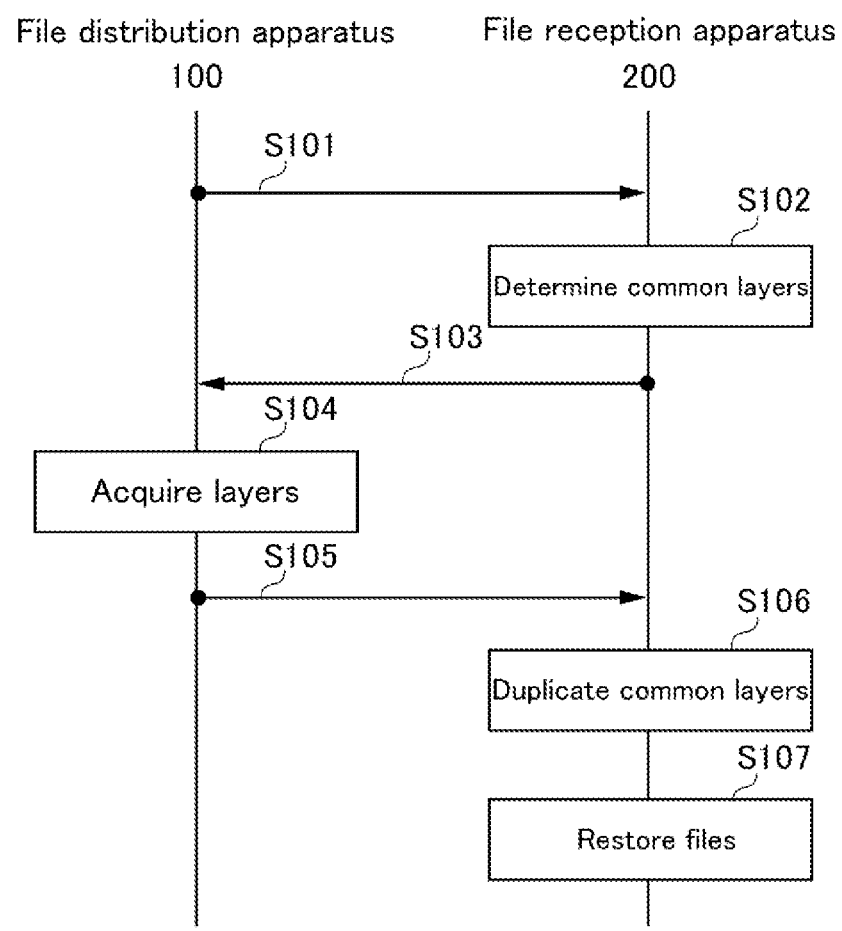
FIG. 3 is a sequence diagram indicating a file distribution method according to Embodiment 1.

Next, the file distribution method in the file distribution system configured as described above will be explained with reference to the sequence diagram indicated in FIG. 3.

When deploying a VNF in a GC 20, the file distribution apparatus 100 in the CDC 10 transmits, to the file reception apparatus 200 in the GC 20, a download command providing instructions to download multiple files necessary for deploying the VNF (step S101). The download command includes layer information specifying the layers constituting each of the multiple files to be downloaded.

The file reception apparatus 200 receiving the download command references the layer information included in the download command and determines whether or not the multiple files to be downloaded include common layers (step S102). Specifically, the file reception apparatus 200, for example, compares the layer information of a first file to be downloaded with the layer information of a second file to be downloaded, and determines whether or not common layers are included in the first and second files.

Then, in the case in which the multiple files include common layers, the file reception apparatus 200 determines the layers that are to be requested so that the common layers are not redundantly transmitted, and transmits, to the file distribution apparatus 100, a layer request for requesting the layers constituting the files to be downloaded (step S103). That is, the file reception apparatus 200 transmits, to the file distribution apparatus 100, a layer request requesting that all of the layers constituting the multiple files to be downloaded be transmitted a single time each.

The file distribution apparatus 100, having received the layer request, acquires the requested layers from the storage 15 located in the CDC 10 (step S104), and transmits the layers to the file reception apparatus 200 (step S105). The layers transmitted in this case are the layers constituting the files to be downloaded, among which the common layers are transmitted a single time regardless of the number of files to be downloaded. For this reason, the communication traffic between the file distribution apparatus 100 and the file reception apparatus 200 can be reduced and the load on the network can be suppressed.

The file reception apparatus 200, receiving the layers, duplicates the common layers as needed based on the layer information of the files to be downloaded (step S106). That is, the common layers in the multiple files to be downloaded are duplicated so as to be able to restore all of the files to be downloaded. Then, the file reception apparatus 200 uses the received layers and the duplicated common layers to restore the files to be downloaded based on the layer information (step S107). In this way, the VNF can be deployed by using the restored files in the GC 20 in which the file reception apparatus 200 is located.

As described above, according to the present embodiment, the file reception apparatus requests the transmission of layers constituting files to be downloaded so that common layers are not redundantly transmitted, and the file distribution apparatus transmits the layers in accordance with the request from the file reception apparatus. Then, the file reception apparatus duplicates the common layers as needed and restores the files by using the received layers and the duplicated common layers. For this reason, common layers that are common to multiple files downloaded to the same facility will not be redundantly transmitted, so that communication traffic between facilities can be reduced and the load on the network can be suppressed.

Embodiment 2

In Embodiment 1 described above, the file reception apparatus 200 determines whether or not there are common layers in the files to be downloaded, and requests the file distribution apparatus 100 to transmit layers so that common layers are not redundantly transmitted. However, whether or not there are common layers in the files to be downloaded can also be determined by the file distribution apparatus 100. Therefore, for Embodiment 2, the case in which the file distribution apparatus 100 determines whether or not there are common layers and implements control so that common layers are not redundantly transmitted will be explained.

Figure 4:
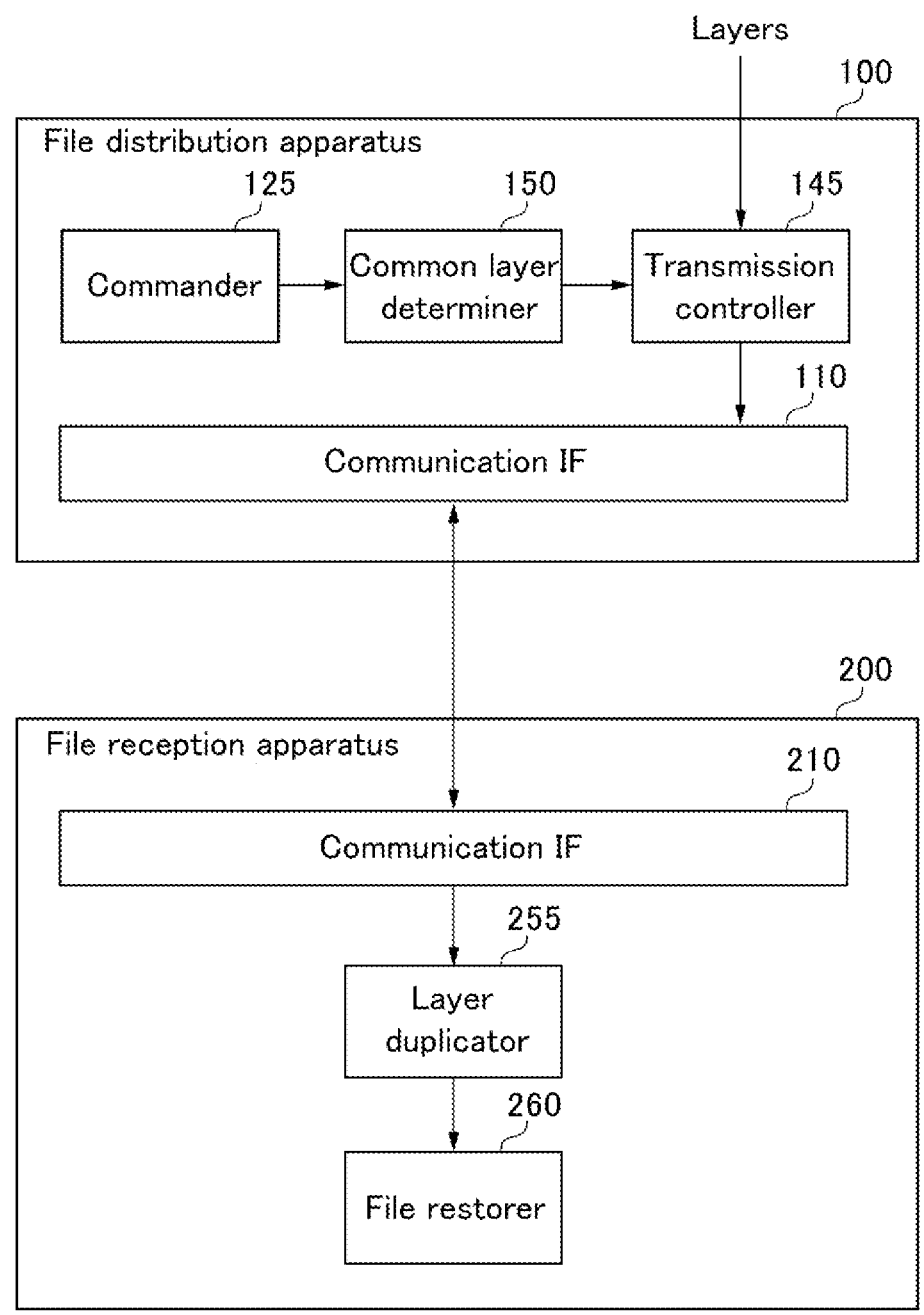
FIG. 4 is a block diagram depicting the configuration of a file distribution system according to Embodiment 2.

The file distribution system according to Embodiment 2, like the file distribution system according to Embodiment 1 (FIG. 1), has a CDC 10 provided with a storage 15 and a file distribution apparatus 100, and GCs 20 provided with file reception apparatuses 200. FIG. 4 is a block diagram depicting the configuration of a file distribution system according to Embodiment 2. In FIG. 4, the portions that are the same as those in FIG. 2 are assigned the same reference signs, and their explanations will be omitted.

The file distribution apparatus 100 has a communication IF 110, a commander 125, a common layer determiner 150, and a transmission controller 145.

The commander 125 outputs, to the common layer determiner 150, a transmission command providing instructions to transmit the files necessary for deploying a VNF to the file reception apparatus 200. The transmission command output by the commander 125 includes layer information specifying the layers constituting each of the multiple files to be downloaded to the file reception apparatus 200.

The common layer determiner 150 references the layer information included in the transmission command and determines whether or not the multiple files to be downloaded include common layers. Specifically, the common layer determiner 150, for example, compares the layer information of a first file to be downloaded with the layer information of a second file to be downloaded, and determines whether or not the first and second files include common layers.

Then, the common layer determiner 150 determines the layers to be transmitted to the file reception apparatus 200 so that common layers common to the multiple files are not redundantly transmitted. That is, the common layer determiner 150 determines, for example, that all of the layers constituting the first file to be downloaded are to be transmitted, and that among the layers constituting the second file to be downloaded, the layers other than the common layers that are common to the first file are to be transmitted. The common layer determiner 150 outputs the layer information to the transmission controller 145 and also notifies the transmission controller 145 of the layers that the common layer determiner 150 has determined are to be transmitted.

The transmission controller 145 acquires the layers reported by the common layer determiner 150 from the storage 15, and transmits them, together with layer information, to the file reception apparatus 200 via the communication IF 110. That is, the transmission controller 145 transmits, to the file reception apparatus 200, the layer information specifying the layers constituting the files to be downloaded, together with the layers constituting the files. At this time, the transmission controller 145 does not redundantly transmit common layers that are common to multiple files to be downloaded. As a result, the communication traffic between the file distribution apparatus 100 and the file reception apparatus 200 can be reduced and the load on the network can be suppressed.

The file reception apparatus 200 has a communication IF 210, a layer duplicator 255, and a file restorer 260.

The layer duplicator 255 acquires the layer information and the layers transmitted from the file distribution apparatus 100 and received by the communication IF 210. Then, the layer duplicator 255 references the layer information and duplicates the layers necessary for restoring the files to be downloaded. That is, the layer duplicator 255 duplicates the required number of the common layers that are common to the multiple files to be downloaded for restoring all of the files to be downloaded.

Figure 5:
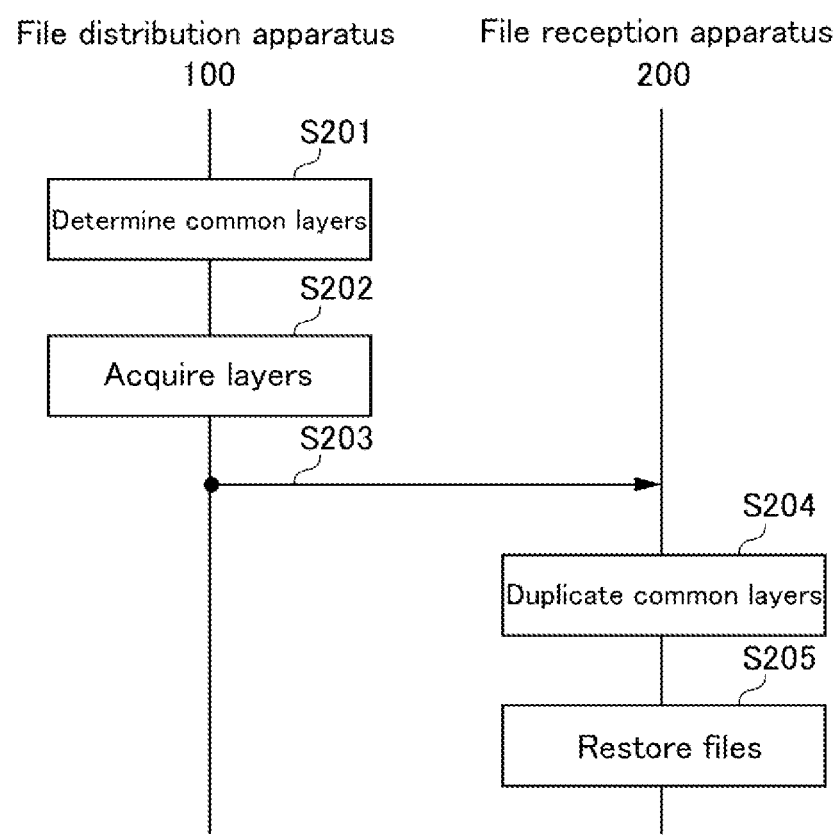
FIG. 5 is a sequence diagram indicating a file distribution method according to Embodiment 2.

Next, the file distribution method in the file distribution system configured as described above will be explained with reference to the sequence diagram indicated in FIG. 5.

When deploying a VNF in a GC 20, the file distribution apparatus 100 in the GDC 10 issues a transmission command providing instructions to transmit multiple files necessary for deploying the VNF. The transmission command includes layer information specifying the layers constituting each of the multiple files to be downloaded. Then, the file distribution apparatus 100 references the layer information included in the transmission command and determines whether or not the multiple files to be downloaded include common layers (step S201). Specifically, the file distribution apparatus 100, for example, compares the layer information of a first file to be downloaded with the layer information of a second file to be downloaded, and determines whether or not the first and second files include common layers.

Then, in the case in which the multiple files include common layers, the file distribution apparatus 100 determines the layers that are to be transmitted so that the common layers are not redundantly transmitted, acquires the determined layers from the storage 15 (step S202), and transmits the layers, together with the layer information, to the file reception apparatus 200 (step S203). Although the layers transmitted in this case are layers constituting the files to be downloaded, the common layers are transmitted a single time, regardless of the number of files that are to be downloaded. For this reason, the communication traffic between the file distribution apparatus 100 and the file reception apparatus 200 can be reduced and the load on the network can be suppressed.

The file reception apparatus 200, receiving the layers and the layer information, duplicates the common layers as needed based on the layer information (step S204). That is, the common layers that are common to the multiple files to be downloaded are duplicated so as to be able to restore all of the files to be downloaded. Then, the file reception apparatus 200 uses the received layers and the duplicated common layers to restore the files to be downloaded based on the layer information (step S205). In this way, the VNF can be deployed by using the restored files in the GC 20 in which the file reception apparatus 200 is located.

As described above, according to the present embodiment, the file distribution apparatus transmits, to the file reception apparatus, layers constituting files to be downloaded so that common layers are not redundantly transmitted. The file reception apparatus duplicates the common layers as needed and restores the files by using the received layers and the duplicated common layers. For this reason, common layers that are common to multiple files downloaded to the same facility will not be redundantly transmitted, so that communication traffic between facilities can be reduced and the load on the network can be suppressed.

Embodiment 3

In Embodiments 1 and 2 described above, the case in which the file distribution apparatus 100 transmits the layers constituting the files so that common layers are not redundantly transmitted was explained. However, in the case in which the multiple files to be downloaded do not include common layers, a communication traffic reduction effect due to avoiding redundant transmission of common layers cannot be obtained. Therefore, for Embodiment 3, the case in which the source code of multiple files is rewritten to ensure layer commonization will be explained.

Figure 6:
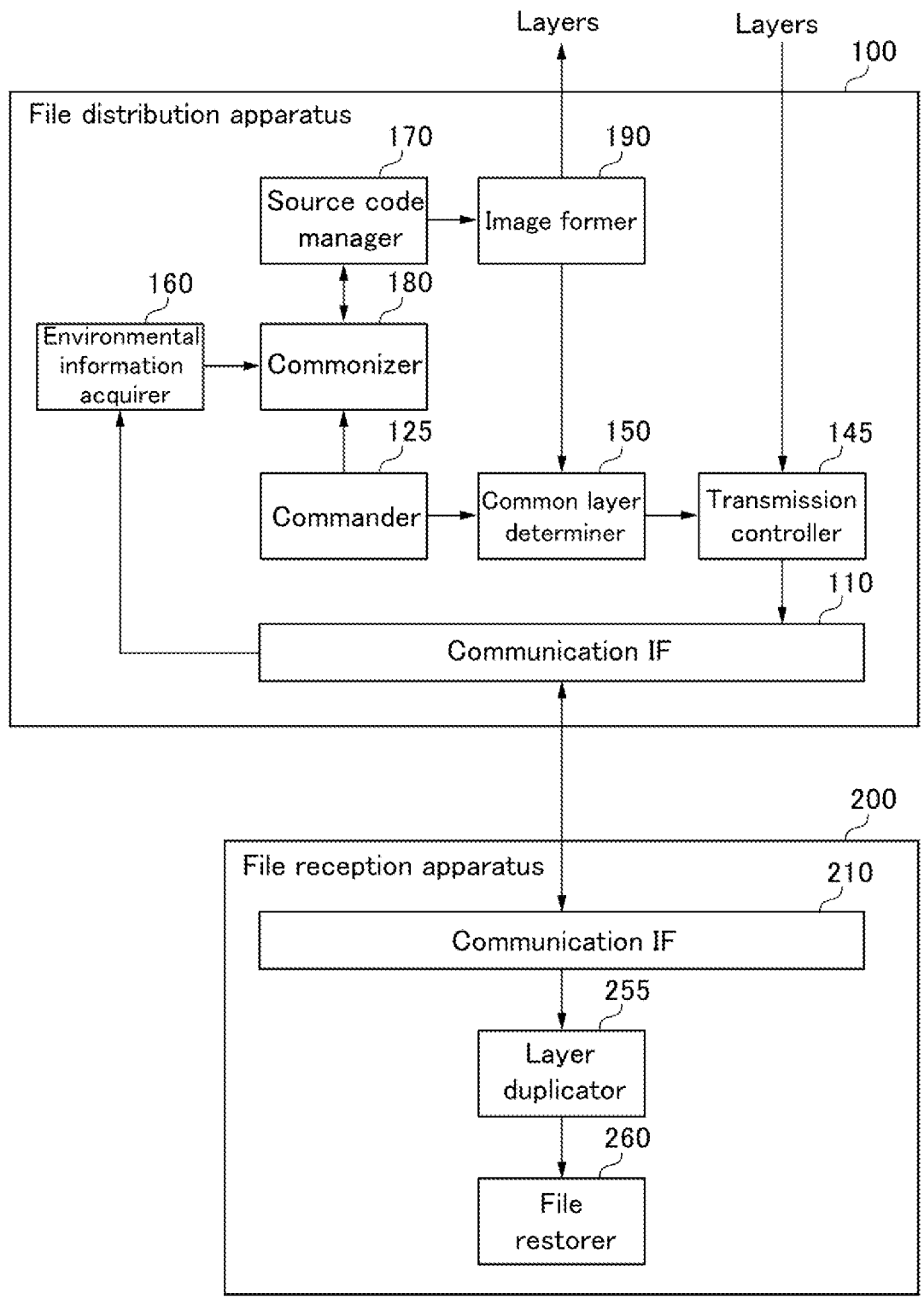
FIG. 6 is a block diagram depicting the configuration of a file distribution system according to Embodiment 3.

The file distribution system according to Embodiment 3, like the file distribution system according to Embodiment 1 (FIG. 1), has a CDC 10 provided with a storage 15 and a file distribution apparatus 100, and GCs 20 provided with file reception apparatuses 200. FIG. 6 is a block diagram depicting the configuration of a file distribution system according to Embodiment 3. In FIG. 6, the portions that are the same as those in FIGS. 2 and 4 are assigned the same reference signs, and their explanations will be omitted.

The file distribution apparatus 100 depicted in FIG. 6 employs a configuration in which an environmental information acquirer 160, a source code manager 170, a commonizer 180, and an image former 190 are added to the file distribution apparatus 100 depicted in FIG. 4. In this case, the respective processing devices are added to the file distribution apparatus 100 depicted in FIG. 4. However, the environmental information acquirer 160, the source code manager 170, the commonizer 180, and the image former 190 may similarly be added to the file distribution apparatus 100 depicted in FIG. 2.

The environmental information acquirer 160 acquires environmental information relating to layer commonization. Specifically, the environmental information acquirer 160 acquires, as the environmental information, the capacity of the communication channel between the file distribution apparatus 100 and the file reception apparatus 200, the capacity of a storage area in the file reception apparatus 200, and the like. If the capacity of the communication channel is small, then it is preferable to have more commonized layers in order to reduce the number of layers that are to be transmitted. Additionally, if the capacity of the storage area in the file reception apparatus 200 is small, then it is preferable not to have too many commonized layers in order to reduce the number of times that layers are duplicated.

The source code manager 170 manages the source codes of files. That is, the source code manager 170 stores the source code of each file. The source codes of the respective files include, for example, command code and the like for installing different libraries or applications for each file.

When a transmission command for files to be downloaded is issued by the commander 125, the commonizer 180 reads out, from the source code manager 170, the source codes of the multiple files that are to be downloaded. Then, the commonizer 180 determines a layer commonization policy based on the environmental information acquired by the environmental information acquirer 160, and rewrites the source codes of the respective files so that the layers in the multiple files are commonized in accordance with the determined policy. The commonizer 180 stores the rewritten source codes in the source code manager 170.

Figure 7:
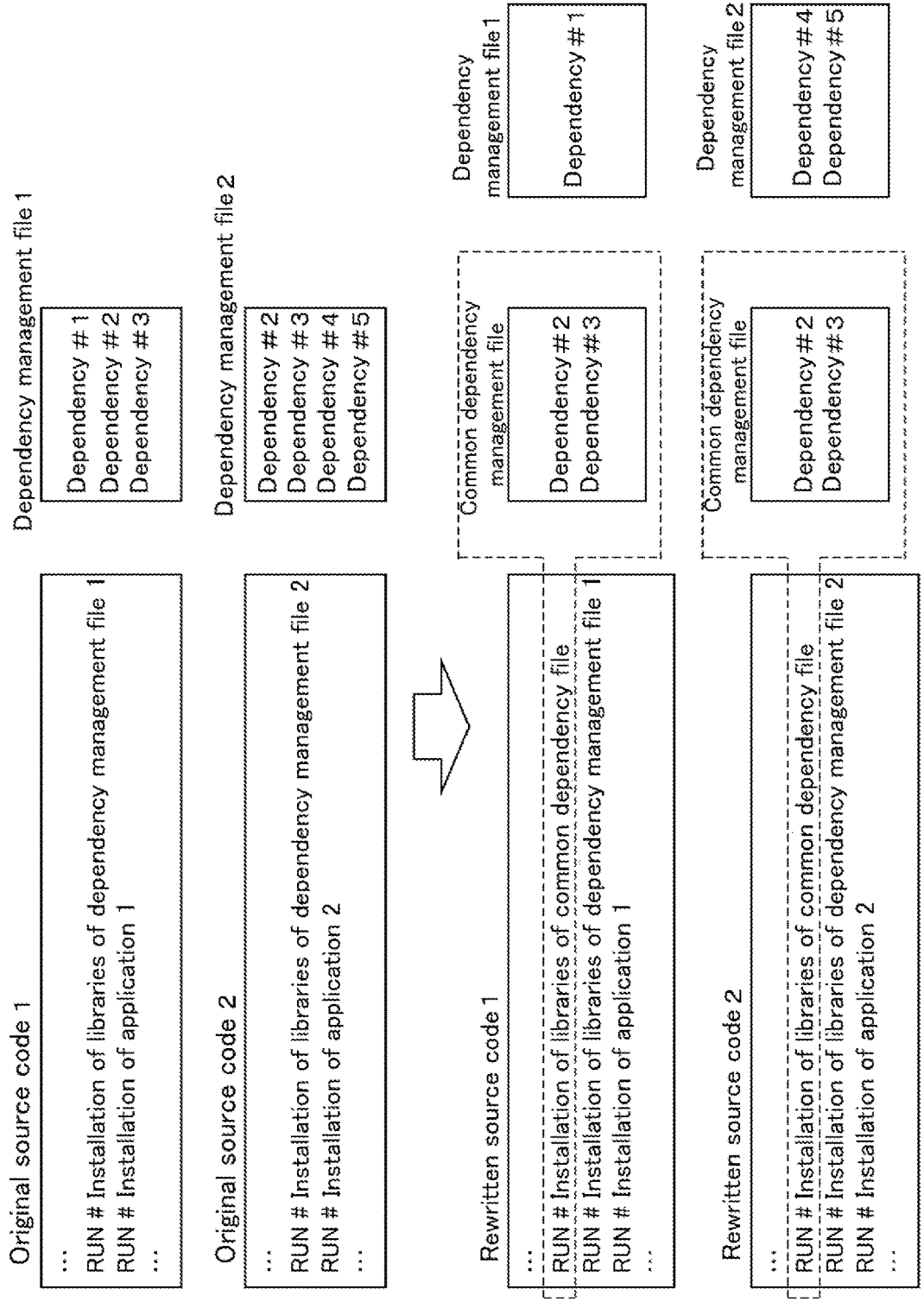
FIG. 7 is a diagram indicating an example of rewriting source code.

Hereinafter, specific examples of layer commonization by the commonizer 180 will be explained. FIG. 7 is a diagram indicating a specific example of layer commonization by rewriting source code. The case in which layers are commonized by rewriting the source codes of two files will be explained.

As indicated in FIG. 7, the commonizer 180 reads out, from the source code manager 170, an original source code 1 and an original source code 2, which are the source codes of two files. Dependency management files 1 and 2 for managing the dependencies of libraries are associated with each of the original source codes 1 and 2.

The original source code 1 includes a command to install the libraries of the dependency management file 1 and a command to install the application 1. The dependency management file 1 defines dependencies #1, #2, and #3 of the libraries. Meanwhile, the original source code 2 includes a command to install the libraries of the dependency management file 2 and a command to install the application 2. The dependency management file 2 defines dependencies #2, #3, #4, and #5 of the libraries.

Thus, the original source codes 1 and 2 do not have any portions in common, and the files built by forming images from these original source codes 1 and 2 do not include common layers. Therefore, the commonizer 180 rewrites the original source codes 1 and 2, respectively, for example, as in the rewritten source codes 1 and 2. That is, the dependencies #2 and #3, which are common to the dependency management files 1 and 2, are managed by a common dependency management file, and a command to install libraries from the common dependency management file is included in both source codes.

By rewriting the source codes in this way, the rewritten source code 1 includes a command to install the libraries in the common dependency management file, a command to install the libraries in the dependency management file 1, and a command to install the application 1. The dependency management file 1 defines the dependency #1, which is not included in the common dependency management file. Meanwhile, the rewritten source code 2 includes a command to install the libraries in the common dependency management file, a command to install the libraries in the dependency management file 2, and a command to install the application 2. The dependency management file 2 defines the dependencies #4 and #5, which are not included in the common dependency management file.

Due to the commonizer 180 rewriting the source codes in this way, the portions of the rewritten source codes 1 and 2 that are surrounded by the dashed lines in the drawing become common portions, and the files that are built by forming images of these rewritten source codes 1 and 2 include common layers corresponding to the common portions. The commonizer 180 stores, in the source code manager 170, the rewritten source codes 1 and 2 that have been rewritten to include common layers.

Returning to FIG. 6, the imager former 190 prepares image files from the source codes stored in the source code manager 170. That is, the image former 190 builds files constituted by multiple layers based on the source codes. The image former 190 monitors the source codes stored in the source code manager 170, and when a source code is updated, prepares a file from the updated source code. Therefore, when a source code is rewritten by the commonizer 180, the image former 190 prepares a file from the rewritten source code. Then, the image former 190 stores the layers constituting the prepared file in the storage 15. Additionally, the image former 190 generates layer information specifying the layers constituting the files and outputs the layer information to a common layer determiner 150.

In the present embodiment, when the commander 125 issues a transmission command providing instructions to transmit files necessary for deploying a VNF, the commonizer 180 determines a layer commonization policy based on the environmental information. That is, for example, if the capacity of the communication channel between the file distribution apparatus 100 and the file reception apparatus 200 is small, then a policy of making more common layers to reduce the number of layers to be transmitted is adopted. Alternatively, if the capacity of the storage area of the file reception apparatus 200 is small, then a policy of not making too many common layers to reduce the number of times the layers in the file reception apparatus 200 are duplicated is adopted.

Figure 8:
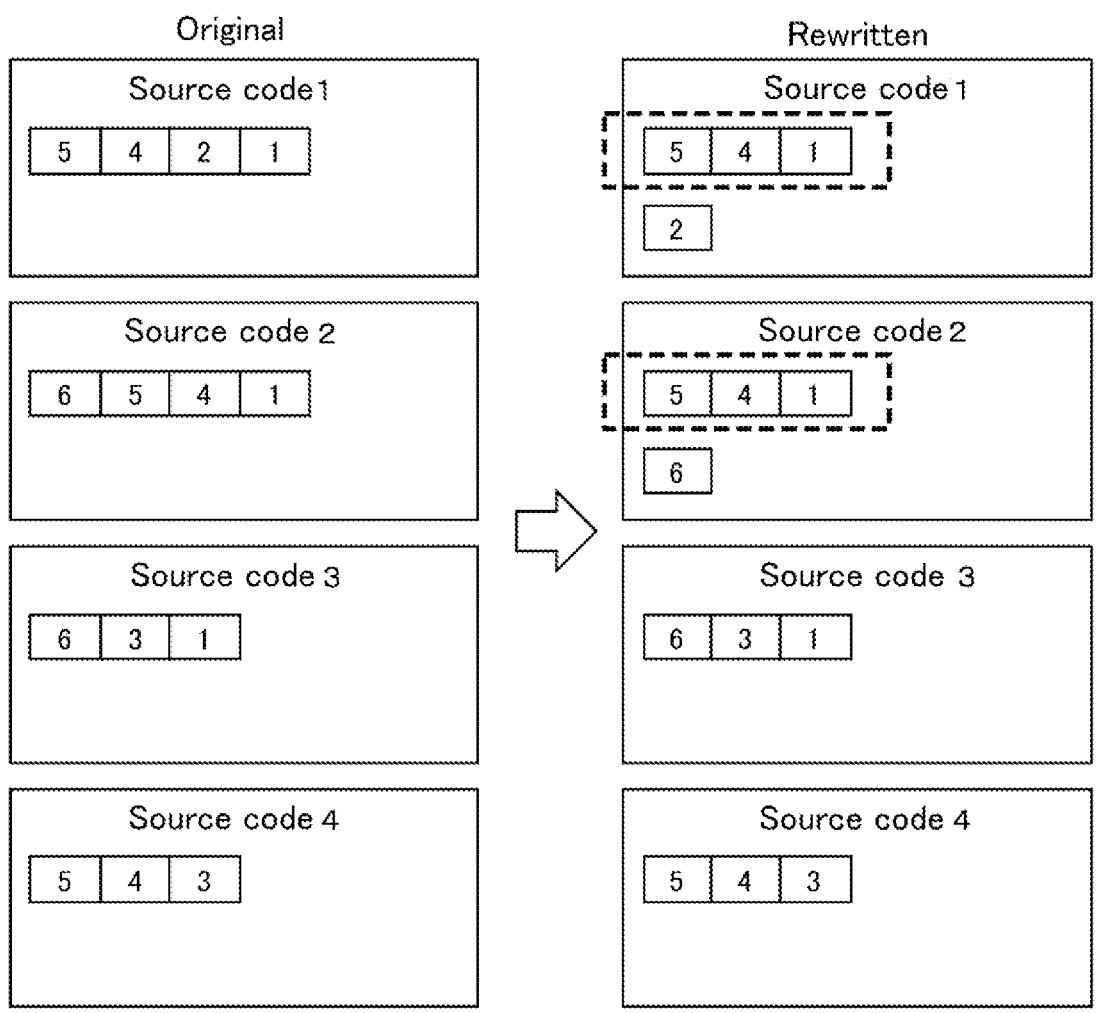
FIG. 8 is a diagram indicating an example of layer commonization.
Figure 9:
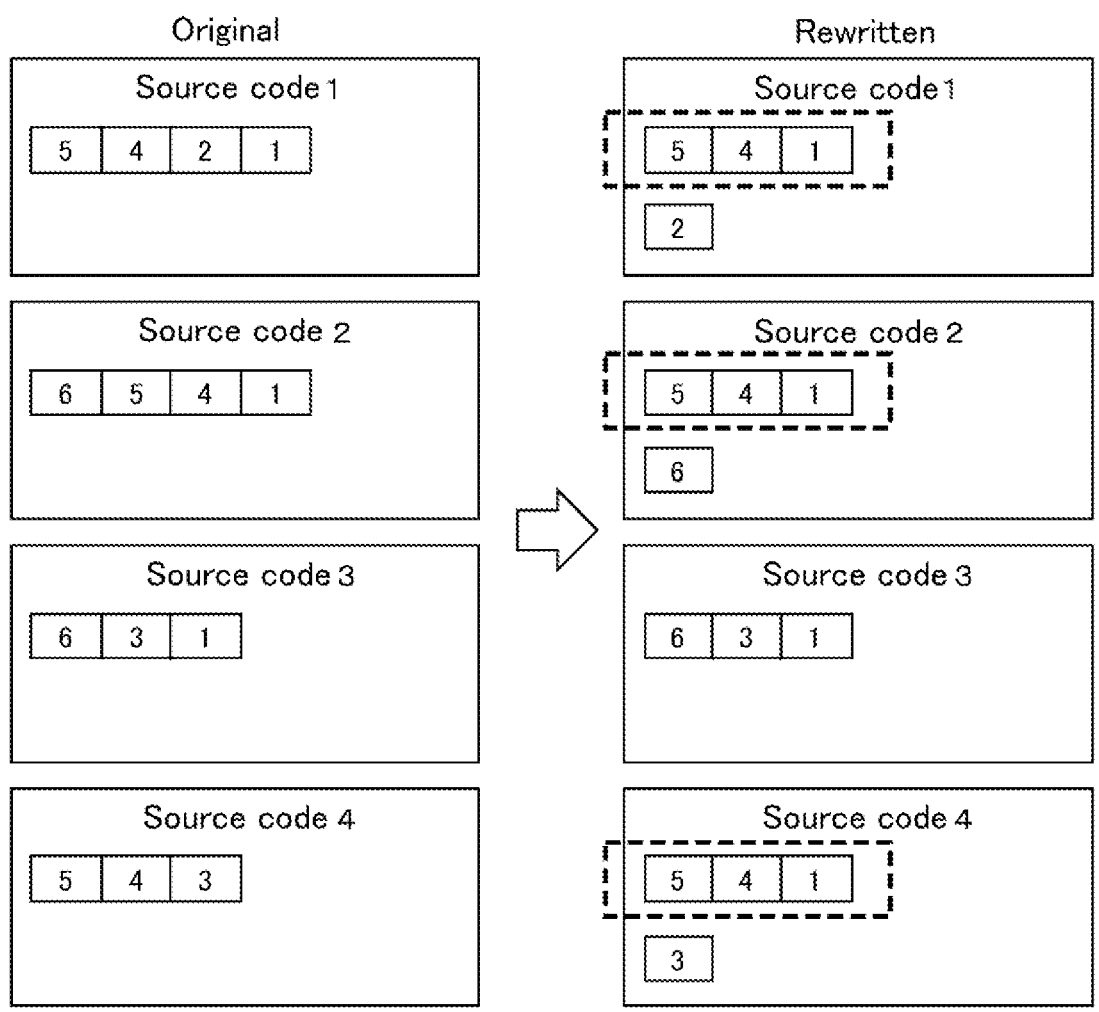
FIG. 9 is a diagram indicating another example of layer commonization.
Figure 10:
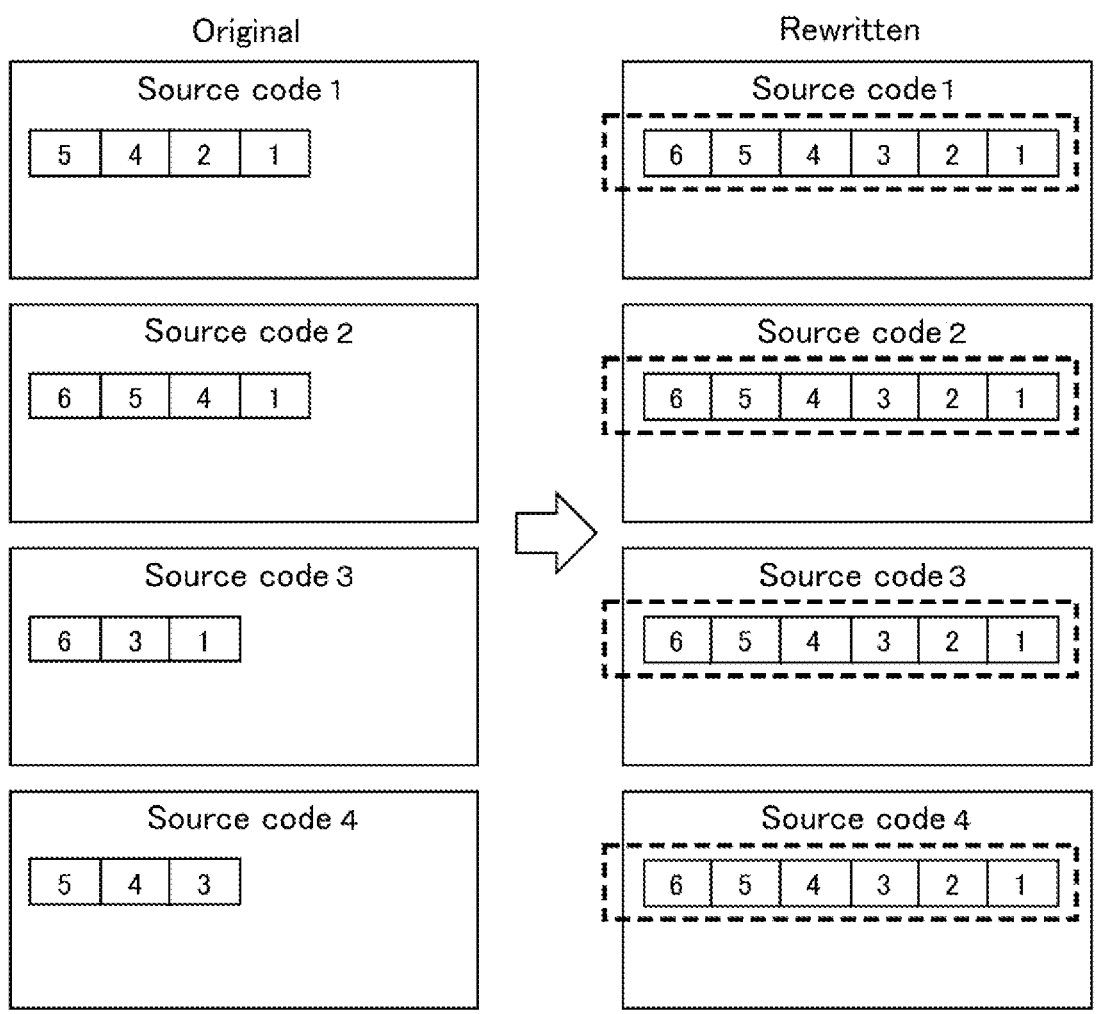
FIG. 10 is a diagram yet another example of layer commonization.

Hereinafter, layer commonization policies will be explained by giving specific examples. FIGS. 8, 9, and 10 are diagrams schematically indicating the rewriting of the source code in four files. In these drawings, the source codes of each of the four files are configured to include multiple blocks. The numbers in the drawings indicate the data sizes of the respective blocks, and the blocks with equal data sizes also have the same content. For example, the original source code 1 indicated in FIGS. 8, 9, and 10 is composed of four blocks of sizes 5, 4, 2, and 1, and the original source code 2 is composed of four blocks of sizes 6, 5, 4, and 1. Furthermore, the original source codes 1 and 2 include blocks of sizes 5, 4, and 1, the contents of which are the same.

Additionally, when preparing a file from each of the source codes, the blocks in a single line of the source code will be considered to correspond to a single layer. Therefore, for example, the four blocks of sizes 5, 4, 2, and 1 constituting the original source code 1 form a single layer in the case in which a file is prepared from this source code.

FIG. 8 indicates an example of the case in which the original source codes 1 and 2 are rewritten so that the files prepared from the source codes 1 and 2 include common layers.

The size of the file prepared from the original source code 1 is 12 (=5+4+2+1), the size of the file prepared from the original source code 2 is 16 (=6+5+4+1), the size of the file prepared from the original source code 3 is 10 (6+3+1), and the size of the file prepared from the original source code 4 is 12 (=5+4+3).

For this reason, when these four files are downloaded as they are, then the communication channel capacity used between the file distribution apparatus 100 and the file reception apparatus 200 is 50 (=12+16+10+12). Additionally, when storing these files in the file reception apparatus 200, the amount of the storage area used in the file reception apparatus 200 is 50.

In contrast therewith, the case in which the source codes 1 and 2 are rewritten so that common portions in the original source codes 1 and 2 become common layers will be considered. In this case, the files prepared from the rewritten source codes 1 and 2 will include common layers comprising the blocks of sizes 5, 4, and 1 surrounded by the dashed lines in the drawing. Furthermore, since the file distribution apparatus 100 does not redundantly transmit the common layers, the communication channel capacity used to download the files prepared from the source codes 1 and 2 is 18 (=5+4+1+2+6), the communication channel capacity used to download the file prepared from the source code 3 is 10, and the communication channel capacity used to download the file prepared from the source code 4 is 12.

Therefore, the communication channel capacity between the file distribution apparatus 100 and the file reception apparatus 200 used in order to download the four files prepared from the rewritten source codes is 40 (=18+10+12). Additionally, since the files are stored by duplicating the common layers in the file reception apparatus 200, the amount of the storage area used in the file reception apparatus 200 is 50.

Thus, due to the layer commonization indicated in FIG. 8, the amount of data downloaded from the file distribution apparatus 100 to the file reception apparatus 200 can be reduced from 50 to 40, thereby suppressing the load on the network.

FIG. 9 indicates an example of the case in which the original source codes 1, 2, and 4 are rewritten so that the files prepared from the source codes 1, 2, and 4 include common layers.

In the case in which the four files prepared from the original source codes are downloaded as they are, as in the case of FIG. 8 mentioned above, the communication channel capacity used between the file distribution apparatus 100 and the file reception apparatus 200 is 50 (=12+16+10+12). Additionally, when storing these files in the file reception apparatus 200, the amount of the storage area used in the file reception apparatus 200 is 50 (=12+16+10+12).

In contrast therewith, the case in which the source codes 1, 2, and 4 are rewritten so that the files prepared from the source codes 1, 2, and 4 include common layers will be considered. For example, the source codes 1, 2, and 4 can be rewritten so as to include common layers comprising the blocks of the sizes 5, 4, and 1 surrounded by the dashed lines in the drawing. Although the original source code 4 does not include a block with a size of 1, by rewriting the source code 4 so as to have a layer including an unnecessary block, the files prepared from the source codes 1, 2, and 4 can be made to include common layers. Furthermore, since the file distribution apparatus 100 does not redundantly transmit the common layers, the communication channel capacity used to download the files prepared from the source codes 1, 2, and 4 is 21 (=5+4+1+2+6+3), and the communication channel capacity used to download the file prepared from the source code 3 is 10.

Therefore, the communication channel capacity between the file distribution apparatus 100 and the file reception apparatus 200 used in order to download the four files prepared from the rewritten source codes is 31 (=21+10). Additionally, since the files are stored by duplicating the common layers in the file reception apparatus 200, the amount of the storage area used in the file reception apparatus 200 is 51 (=12+16+10+13).

Thus, due to the layer commonization indicated in FIG. 9, the amount of data downloaded from the file distribution apparatus 100 to the file reception apparatus 200 can be reduced from 50 to 31, thereby suppressing the load on the network. Conversely, the amount of the storage area used in the file reception apparatus 200 increases from 50 to 51.

FIG. 10 indicates an example of the case in which the original source codes 1, 2, 3, and 4 are rewritten so that the files prepared from the source codes 1, 2, 3, and 4 include common layers.

In the case in which the four files prepared from the original source codes are downloaded as they are, as in the case of FIG. 8 mentioned above, the communication channel capacity used between the file distribution apparatus 100 and the file reception apparatus 200 is 50 (=12+16+10+12). Additionally, when storing these files in the file reception apparatus 200, the amount of the storage area used in the file reception apparatus 200 is 50 (=12+16+10+12).

In contrast therewith, the case in which the source codes 1, 2, 3, and 4 are rewritten so that the files prepared from the source codes 1, 2, 3, and 4 include common layers will be considered. For example, the source codes 1, 2, 3, and 4 can be rewritten so as to include common layers comprising the blocks of all types surrounded by the dashed lines in the drawing. Although the common layers include unnecessary blocks not present in the respective original source codes, by rewriting each source code so as to have a layer including unnecessary blocks, all of the files prepared from the respective source codes can be made to include common layers. Furthermore, since the file distribution apparatus 100 does not redundantly transmit the common layers, the communication channel capacity used to download the files prepared from the source codes 1, 2, 3, and 4 is 21 (=6+5+4+3+2+1).

Therefore, the communication channel capacity between the file distribution apparatus 100 and the file reception apparatus 200 used in order to download the four files prepared from the rewritten source codes is 21. Additionally, since the files are stored by duplicating the common layers in the file reception apparatus 200, the amount of the storage area used in the file reception apparatus 200 is 84 (=21+21+21+21).

Thus, due to the layer commonization indicated in FIG. 10, the amount of data downloaded from the file distribution apparatus 100 to the file reception apparatus 200 can be largely reduced from 50 to 21, thereby suppressing the load on the network. Conversely, the amount of the storage area used in the file reception apparatus 200 increases from 50 to 84.

Although three specific examples of layer commonization under respectively different policies were indicated above, the amounts of data that are downloaded and the amounts of the storage area that are used in the file reception apparatus 200 differ in accordance with the respective commonization policies. Therefore, the commonizer 180 determines a layer commonization policy optimizing the amount of data that is downloaded and the amount of storage area that is used based on the environmental information indicating, for example, the capacity of the communication channel and the capacity of the storage area in the file reception apparatus 200. Then, the commonizer 180 implements layer commonization by rewriting the source codes of the respective files in accordance with the determined policy.

Since the files downloaded to the file reception apparatus 200 are made to include common layers by the layer commonization, as with Embodiments 1 and 2, by keeping the common layers from being redundantly transmitted, communication traffic between facilities can be reduced and the load on the network can be suppressed.

As described above, according to the present embodiment, the file distribution apparatus determines a layer commonization policy based on environmental information, and rewrites the source codes of multiple files to be downloaded so that the files include common layers. Furthermore, the file distribution apparatus transmits the layers constituting the multiple files to be downloaded to the file reception apparatus so that the common layers are not redundantly transmitted. For this reason, in the case in which multiple files are downloaded to the same facility, a reduction in the communication traffic can be achieved by commonizing the layers in these files and avoiding redundant transmission of the common layers. As a result, the communication traffic between facilities can be reduced and the load on the network can be suppressed.

Figure 11:
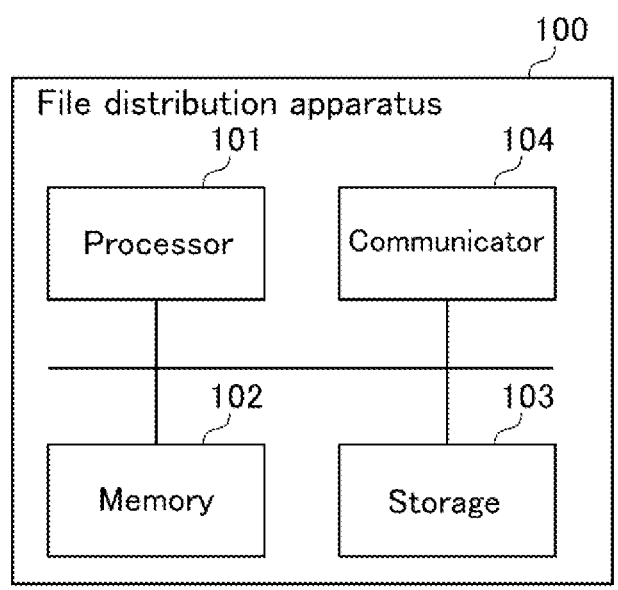
FIG. 11 is a block diagram depicting an example of the hardware configuration of a file distribution apparatus.

The file distribution apparatus 100 according to each of the embodiments described above can be configured by using a processor and memory. FIG. 11 is a block diagram depicting an example of the hardware configuration of the file distribution apparatus 100 according to each of the embodiments. As depicted in FIG. 11, the file distribution apparatus 100 has a processor 101, a memory 102, a storage 103, and a communicator 104.

The processor 101, which has, for example, a central processing unit (CPU), a field-programmable gate array (FPGA), a digital signal processor (DSP), or the like, comprehensively controls the file distribution apparatus 100 as a whole and executes various types of information processing.

The memory 102, which has, for example, a random access memory (RAM), a read-only memory (ROM), or the like, stores information used for the information processing executed by the processor 101.

The storage 103, which has, for example, a hard disk drive (HDD), a solid-state drive (SSD), or the like, saves various type of data. The storage 103 may be provided integrally with the storage 15 in the CDC 10, or may be provided as a separate body.

The communicator 104, which has an interface for executing wired communication or wireless communication, communicates with the file reception apparatus 200.

The file distribution apparatus 100 may have other features that are not illustrated, such as, for example, a display or an operating switch.

Figure 12:
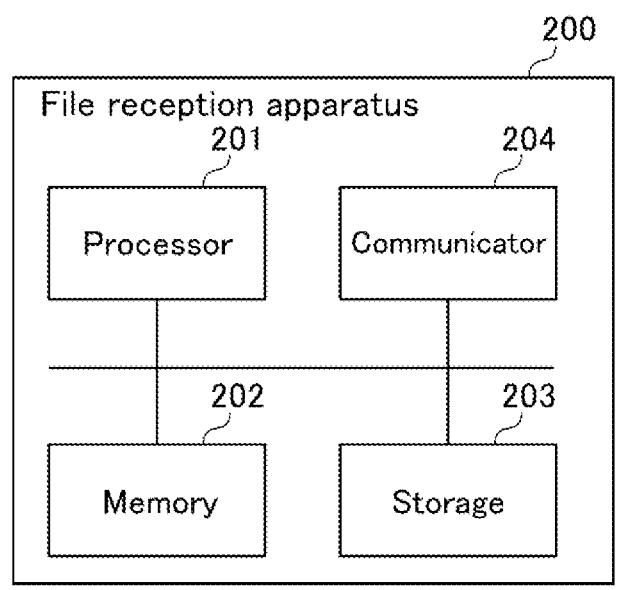
FIG. 12 is a block diagram depicting an example of the hardware configuration of a file reception apparatus.

Similarly, the file reception apparatus 200 according to each of the embodiments described above can be configured by using a processor and a memory. FIG. 12 is a block diagram depicting an example of the hardware configuration of the file reception apparatus 200 according to each of the embodiments. As depicted in FIG. 12, the file reception apparatus 200 has a processor 201, a memory 202, a storage 203, and a communicator 204.

The processor 201, which has, for example, a CPU, an FPGA, a DSP, or the like, comprehensively controls the file reception apparatus 200 as a whole and executes various types of information processing.

The memory 202, which has, for example, a RAM, a ROM, or the like, stores information used for the information processing executed by the processor 201.

The storage 203, which has, for example, an HDD, an SSD, or the like, stores various types of data.

The communicator 204, which has an interface for executing wired communication or wireless communication, communicates with the file distribution apparatus 100.

The file reception apparatus 200 may have other features that are not illustrated, such as, for example, a display or an operating switch.

The processing by the file distribution apparatus 100 and the file reception apparatus 200 explained for the respective embodiments above can be written as programs that can each be executed by a computer. In this case, these programs can be stored in computer-readable non-transitory recording media and introduced to a computer. Such recording media include portable recording media such as, for example, CD-ROMs, DVD discs, and USB memory, and semiconductor memory such as, for example, flash memory.

The present disclosure is not limited to the embodiments described above, and includes various modified examples in which constituent elements have been added, removed, or replaced with respect to the above-mentioned configurations.

Additionally, the term "connect" used in the present disclosure refers to a logical connection for communication. For example, "A connected to B" refers to the fact that A and B are logically connected so as to be able to communicate. Therefore, A and B do not need to be directly connected in a physical manner, such as with a physical cable, and multiple devices or wireless links may be interposed between A and B.

The present disclosure, described above, includes [1] to [6] indicated below.

[1] A file distribution system comprising a file distribution apparatus and a file reception apparatus, wherein:
the file distribution apparatus has
one or more first processors; and
the one or more first processors execute a process including
transmitting, to the file reception apparatus, multiple layers included in a first file to be distributed to the file reception apparatus, and among multiple layers included in a second file to be distributed to the file reception apparatus, a layer other than a common layer that is included in common in the first file and the second file.

[2] The file distribution system as in [1] above, wherein:
the file reception apparatus has
a receiver that receives layers transmitted from the file distribution apparatus, the layers being included in the first file and the second file, and
one or more second processors; and
the one or more second processors execute a process including
duplicating the common layer among the layers included in the first file received by the receiver, and
restoring the second file by using the duplicated common layer and a layer included in the second file received by the receiver.

[3] The file distribution system as in [1] or [2] above, wherein:
the one or more first processors execute the process further including
rewriting a source code of at least one of the first file and the second file so as to include the common layer in the first file and the second file.

[4] The file distribution system as in [3] above, wherein:
the rewriting includes
determining a policy for commonizing layers included in the first file and the second file based on environmental information including information regarding a capacity of a communication channel connecting the file distribution apparatus and the file reception apparatus, and information regarding storage capacity in the file reception apparatus, and rewriting the source code in accordance with the determined policy.

[5] The file distribution system as in [1] or [2] above, wherein:
the one or more second processors execute the process further including
acquiring layer information specifying multiple layers included in the first file and multiple layers included in the second file,
determining whether or not the first file and the second file include a common layer by referencing the acquired layer information, and transmitting to the file distribution apparatus, based on the determination results, a layer request requesting transmission of the multiple layers included in the first file and, among the multiple layers included in the second file, a layer other than the common layer.

[6] A file distribution method including:

transmitting, to a file reception apparatus, multiple layers included in a first file to be distributed to the file reception apparatus, and among multiple layers included in a second file to be distributed to the file reception apparatus, layers other than a common layer that is included in common in the first file and the second file.

REFERENCE SIGNS LIST

10 CDC
15 Storage
20 GC
100 File distribution apparatus
101, 201 Processor
102, 202 Memory
103, 203 Storage
104, 204 Communicator
110, 210 Communication IF
120, 125 Commander
130 Layer request acquirer
140, 145 Transmission controller
150, 230 Common layer determiner
160 Environmental information acquirer
170 Source code manager
180 Commonizer
190 Image former
200 File reception apparatus
220 Command acquirer
240 Layer requester
250, 255 Layer duplicator
260 File restorer

The invention claimed is:

1. A file distribution system comprising a file distribution apparatus and a file reception apparatus, wherein:
the file distribution apparatus has
one or more first processors; and
the one or more first processors execute a process comprising
transmitting, to the file reception apparatus, multiple layers included in a first file to be distributed to the file reception apparatus, and among multiple layers included in a second file to be distributed to the file reception apparatus, a layer other than a common layer that is included in common in the first file and the second file, wherein
the file reception apparatus has
one or more second processors; and
the one or more second processors execute a process comprising
acquiring layer information specifying multiple layers included in the first file and multiple layers included in the second file,
determining whether or not the first file and the second file include a common layer by referencing the acquired layer information, and
transmitting to the file distribution apparatus, based on the determination results, a layer request requesting transmission of the multiple layers included in the first file and, among the multiple layers included in the second file, a layer other than the common layer.

2. The file distribution system according to claim 1, wherein:
the file reception apparatus has
a receiver that receives layers transmitted from the file distribution apparatus, the layers being included in the first file and the second file, and
the one or more second processors execute the process further comprising
duplicating the common layer among the layers included in the first file received by the receiver, and
restoring the second file by using the duplicated common layer and a layer included in the second file received by the receiver.

3. The file distribution system according to claim 1, wherein:
the one or more first processors execute the process further comprising
rewriting a source code of at least one of the first file and the second file so as to include the common layer in the first file and the second file.

4. The file distribution system according to claim 3, wherein:
the rewriting includes
determining a policy for commonizing layers included in the first file and the second file based on environmental information including information regarding a capacity of a communication channel connecting the file distribution apparatus and the file reception apparatus, and information regarding storage capacity in the file reception apparatus, and rewriting the source code in accordance with the determined policy.

5. A file distribution method comprising:
acquiring, by a file reception apparatus, layer information specifying multiple layers included in a first file and multiple layers included in a second file;
determining, by the file reception apparatus, whether or not the first file and the second file include a common layer by referencing the acquired layer information;
transmitting, from the file reception apparatus to a file distribution apparatus, based on the determination results, a layer request requesting transmission of the multiple layers included in the first file and, among the multiple layers included in the second file, a layer other than the common layer; and
transmitting, to the file reception apparatus, the multiple layers included in the first file, and among the multiple layers included in the second file, the layer other than the common layer that is included in common in the first file and the second file.

* * * * *